United States Patent
Maekawa et al.

(10) Patent No.: US 12,131,494 B2
(45) Date of Patent: Oct. 29, 2024

(54) TIRE GROOVE DEPTH DISPLAY METHOD AND TIRE GROOVE DEPTH DISPLAY DEVICE

(71) Applicant: TOYO TIRE CORPORATION, Itami (JP)

(72) Inventors: Takaya Maekawa, Itami (JP); Siyi Ren, Itami (JP); George Lashkhia, Aichi (JP)

(73) Assignee: TOYO TIRE CORPORATION, Itami (JP)

( * ) Notice: Subject to any disclaimer, the term of this patent is extended or adjusted under 35 U.S.C. 154(b) by 43 days.

(21) Appl. No.: 17/940,755

(22) Filed: Sep. 8, 2022

(65) Prior Publication Data
US 2023/0077244 A1    Mar. 9, 2023

(30) Foreign Application Priority Data

Sep. 9, 2021  (JP) .................................. 2021-146986

(51) Int. Cl.
| | |
|---|---|
| G06T 7/593 | (2017.01) |
| B60C 11/24 | (2006.01) |
| G01M 17/02 | (2006.01) |
| G06T 7/11 | (2017.01) |
| G06T 11/00 | (2006.01) |

(52) U.S. Cl.
CPC ............ *G06T 7/593* (2017.01); *B60C 11/246* (2013.01); *G01M 17/027* (2013.01); *G06T 7/11* (2017.01); *G06T 11/00* (2013.01); *G06T 2207/10012* (2013.01); *G06T 2207/10028* (2013.01); *G06T 2207/20021* (2013.01)

(58) Field of Classification Search
CPC . G06T 7/593; G06T 7/11; G06T 11/00; G06T 2207/10012; G06T 2207/10028; G06T 2207/20021; G06T 7/62; G06T 11/206; G06T 7/0004; B60C 11/246; G01M 17/027
USPC .......................................................... 348/46
See application file for complete search history.

(56) References Cited

U.S. PATENT DOCUMENTS

| | | | |
|---|---|---|---|
| 9,805,697 B1 * | 10/2017 | Dorrance | B60C 99/006 |
| 10,179,487 B1 * | 1/2019 | Larson | G06T 19/20 |
| 2017/0190223 A1 * | 7/2017 | Fish | G06T 17/00 |

(Continued)

FOREIGN PATENT DOCUMENTS

| | | |
|---|---|---|
| JP | 2019-518209 A | 6/2019 |
| WO | WO2017/187164 A1 | 11/2017 |
| WO | WO2020202632 A1 | 10/2020 |

*Primary Examiner* — Tung T Vo
(74) *Attorney, Agent, or Firm* — MUNCY, GEISSLER, OLDS & LOWE, P.C.

(57) ABSTRACT

A tire groove depth display method includes a grounded part extracting step, a groove depth calculating step, an image generating step, and a displaying step. The grounded part extracting step extracts a grounded part on a surface of a tread part of a tire as a plurality of areas sandwiching a tire groove. The groove depth calculating step calculates a depth of the tire groove between respective areas of the grounded part. The image generating step generates an image that shows the areas extracted by the grounded part extracting step and information on the depth of the tire groove calculated by the groove depth calculating step. The displaying step displays the image generated by the image generating step.

4 Claims, 8 Drawing Sheets

(56) References Cited

U.S. PATENT DOCUMENTS

2020/0098121 A1\* 3/2020 Tenkasi Shankar .. G06T 7/0004
2022/0099530 A1\* 3/2022 Honda ................. B60C 11/246

\* cited by examiner

TIRE GROOVE DEPTH DISPLAY METHOD AND TIRE GROOVE DEPTH DISPLAY DEVICE

CROSS-REFERENCE TO RELATED APPLICATION

This application is based upon and claims the benefit of priority from the prior Japanese Patent Application No. 2021-146986, filed on Sep. 9, 2021, the entire contents of which are incorporated herein by reference.

BACKGROUND OF THE INVENTION

1. Field of the Invention

The present invention relates to a tire groove depth display method and a tire groove depth display device.

2. Description of the Related Art

Generally, the wear of a tire progresses in dependence on the traveling condition, travel distance, etc. For example, when the tire inflation pressure is low, the sides of the tread part are easily worn, and, when the tire inflation pressure is high, the central part of the tread part is easily worn. Further, when stationary steering is frequently used to pull a vehicle into a garage or for parallel parking, the tire is easily worn in the outward portion of the front axle. Further, there are a number of factors that makes the tire worn unevenly such as the scheme of driving the vehicle, manner of driving, weight balance, sudden acceleration or deceleration, and sudden swinging. For this reason, the wear may not progress evenly in the four tires mounted on a vehicle. The wear may even progress irregularly or locally in one tire.

JP2019-518209 A describes a method of generating a three-dimensional topological surface presentation of a tire of a vehicle. The related-art method uses a tread depth measurement device to record tread depth data for a tire surface that moves relative to the tread depth measurement device and uses a movement profile of the tire surface to map the tread depth data on the basic tire structure and generate a three-dimensional topological surface presentation of the tire.

SUMMARY OF THE INVENTION

The method for generating a three-dimensional topological surface presentation disclosed in JP2019-518209 A generates a topological presentation of a tire. However, there has been a problem in that the worker finds it difficult to know unevenness of the wear of a tire merely by displaying the surface shape of the tire.

The present invention addresses the above issue and a purpose thereof is to provide a tire groove depth display method and a tire groove depth display device capable of improving visibility of unevenness of the wear of a tire.

An embodiment of the present invention relates to a tire groove depth display method. The tire groove depth display method includes: extracting a grounded part on a surface of a tread part of a tire as a plurality of areas sandwiching a tire groove; calculating a depth of the tire groove between respective areas of the grounded part; generating an image that shows the areas extracted by the extracting and information on the depth of the tire groove calculated by the calculating; and displaying the image generated by the generating.

Another embodiment of the present invention relates to a tire groove depth display device. The tire groove depth display device includes: a grounded part extraction unit that extracts a grounded part on a surface of a tread part of a tire as a plurality of areas sandwiching a tire groove; a groove depth calculation unit that calculates a depth of the tire groove between respective areas of the grounded part; an image generation unit that generates an image that shows the areas extracted by the grounded part extraction unit and information on the depth of the tire groove calculated by the groove depth calculation unit; and a display unit that displays the image generated by the image generation unit.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION OF THE INVENTION

Figure 1:
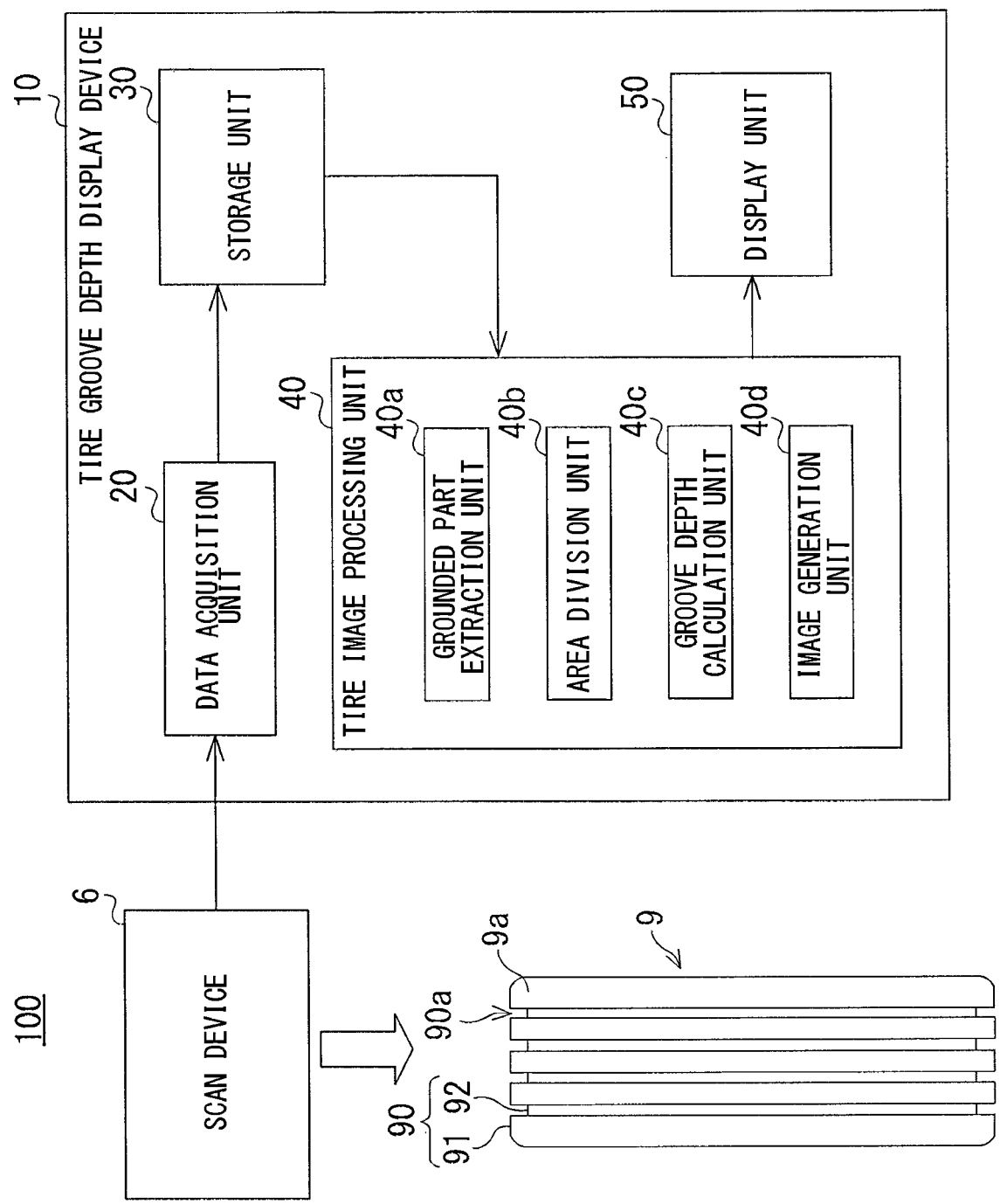
FIG. 1 is a block diagram showing a configuration of a tire groove measurement system that includes a tire groove depth display device according to the embodiment.

The invention will now be described by reference to the preferred embodiments. This does not intend to limit the scope of the present invention, but to exemplify the invention.

Hereinafter, the invention will be described based on a preferred embodiment with reference to FIGS. 1 through 12. Identical or like constituting elements and members shown in the drawings are represented by identical symbols and a duplicate description will be omitted as appropriate. The dimension of members in the drawings shall be enlarged or reduced as appropriate to facilitate understanding. Those of the members that are not important in describing the embodiment are omitted from the drawings.

Embodiment

FIG. 1 is a block diagram showing a configuration of a tire groove measurement system 100 that includes a tire groove depth display device 10 according to the embodiment. The tire groove measurement system 100 includes a tire groove depth display device 10, a scan device 6, etc. The tire groove measurement system 100 measures image data and three-dimensional coordinate data for a surface 90 of a tread part 9a of a tire 9 mounted on a vehicle by using the scan device 6 and calculates and displays the depth of a tire groove 90a by using the tire groove depth display device 10. The tire groove 90a is formed to extend in, for example, a tire circumferential direction.

Figure 2:
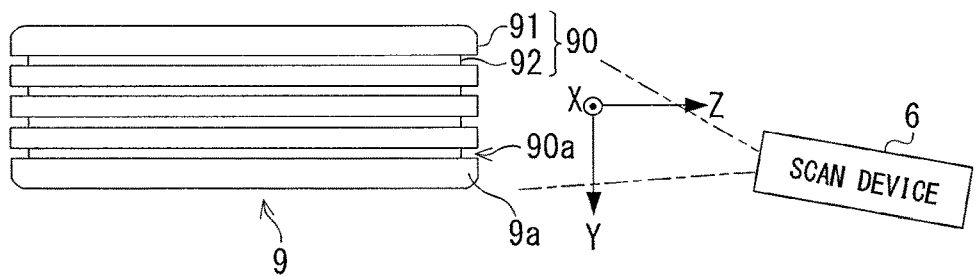
FIG. 2 is a schematic diagram for illustrating measurement by the scan device.

FIG. 2 is a schematic diagram for illustrating measurement by the scan device 6. For example, the scan device 6 captures an image of the surface 90 of the tread part 9a of the tire 9 and measures three-dimensional coordinate data for a point group on the surface 90 according to the principle of a stereo camera. The scan device 6 scans the surface 90 of the tread part 9a to acquire three-dimensional coordinate data for a point group on the surface of a grounded part 91 in contact with the road surface and the surface of a bottom part 92 of the tire groove 90a.

Measurement based on the principle of a stereo camera is performed by, for example, projecting a pattern for measurement onto the surface 90 of the tread part 9a and acquiring three-dimensional coordinate data for a point group on the surface 90 from the data that captures an image of the surface 90 by means of two imaging units (not shown). A publicly known technology such as distance measurement based on the principle of a stereo camera may be used as a scheme to measure three-dimensional coordinate data for the surface 90 of the tread part 9a in the scan device 6.

The scan device 6 acquires three-dimensional coordinate data for a point group on the surface 90 in the orthogonal coordinate system defined in the device. As shown in FIG. 2, the scan device 6 acquires three-dimensional coordinate data for a point group in the orthogonal coordinate system in which the tire radial direction is defined as the Z-axis direction, the tire circumferential direction is defined as the X-axis direction, and the tire axial direction (tire width direction) is defined as the Y-axis direction. The scan device 6 may measure coordinate data for the point group in a local coordinate system defined by the frontal direction toward a subject of measurement and two axes orthogonal thereto and may make a coordinate transform into the (X, Y, Z) coordinate system described above within the scan device 6, the tire groove depth display device 10 described later, etc.

Referring back to FIG. 1, the tire groove depth display device 10 includes a data acquisition unit 20, a storage unit 30, a tire image processing unit 40, and a display unit 50. The parts in the tire groove depth display device 10 can be implemented in hardware such as electronic devices or mechanical components exemplified by a CPU of a computer, and in software such as a computer program. The figure depicts functional blocks implemented by the cooperation of these elements. Therefore, it will be understood by those skilled in the art that the functional blocks may be implemented in a variety of manners by a combination of hardware and software.

The data acquisition unit 20 acquires the three-dimensional coordinate data for the point group on the surface 90 of the tread part 9a from the scan device 6 and stores the data in the storage unit 30. The storage unit 30 is a storage device comprised of a solid state drive (SSD), a hard disk, a random access memory (RAM), etc. The display unit 50 is a display device such as a liquid crystal display and displays an image that shows the areas of the grounded part 91 and the depth of the tire groove 90a.

The tire image processing unit 40 includes a grounded part extraction unit 40a, an area division unit 40b, a groove depth calculation unit 40c, and an image generation unit 40d.

Figure 3:
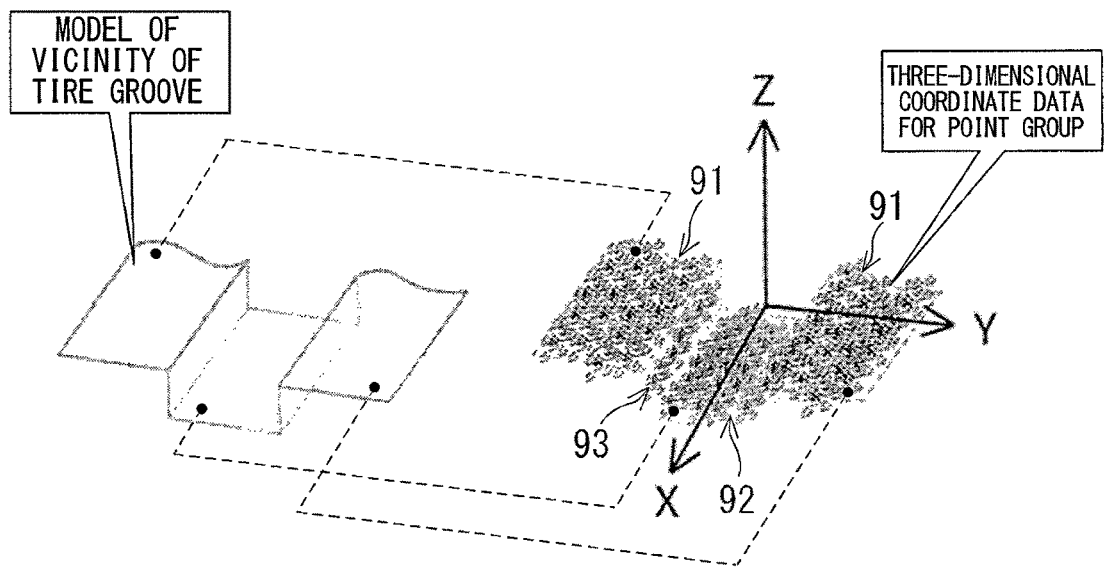
FIG. 3 is a schematic diagram showing the three-dimensional coordinate data acquired by the data acquisition unit.

FIG. 3 is a schematic diagram showing the three-dimensional data acquired by the data acquisition unit 20. FIG. 3 depicts a part on the surface 90 of the tire 9 with a simplified model. Hereinafter, the steps for extraction of the grounded part 91 and calculation of the groove depth of the tire 9 will be described based on this model.

Referring to FIG. 3, the three-dimensional coordinate data for the point group acquired by the data acquisition unit 20 is data in the (X, Y, Z) coordinate system described above and includes data for the grounded part 91, and the bottom part 92 and a side part 93 of the tire groove 90a. The grounded part extraction unit 40a calculates a normal vector at each point on the surface, based on the three-dimensional coordinate data for the point group on the surface 90.

Figure 4:
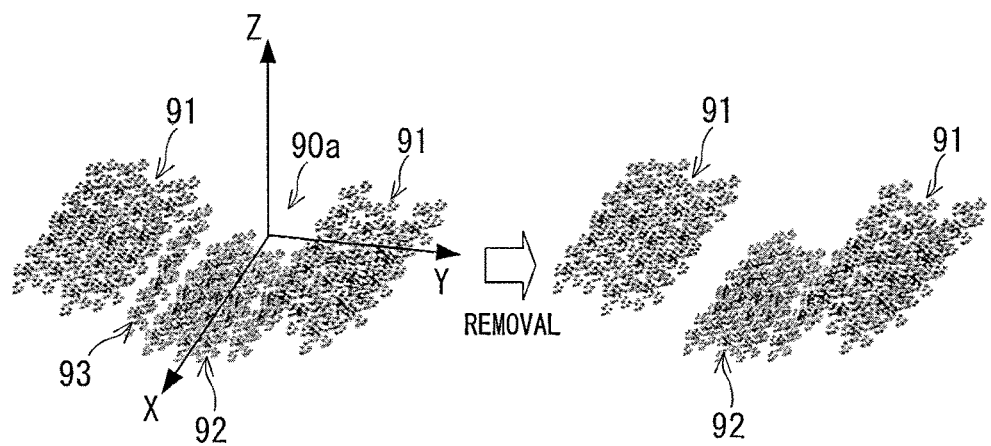
FIG. 4 is a schematic diagram for illustrating removal of a point group by the grounded part extraction unit.

FIG. 4 is a schematic diagram for illustrating removal of a point group by the grounded part extraction unit 40a. Of the point groups on the surface 90, the point group on the side part 93 of the tire groove 90a is removed by the grounded part extraction unit 40a based on the fact that the normal vector is substantially orthogonal to the Z axis.

Figure 5:
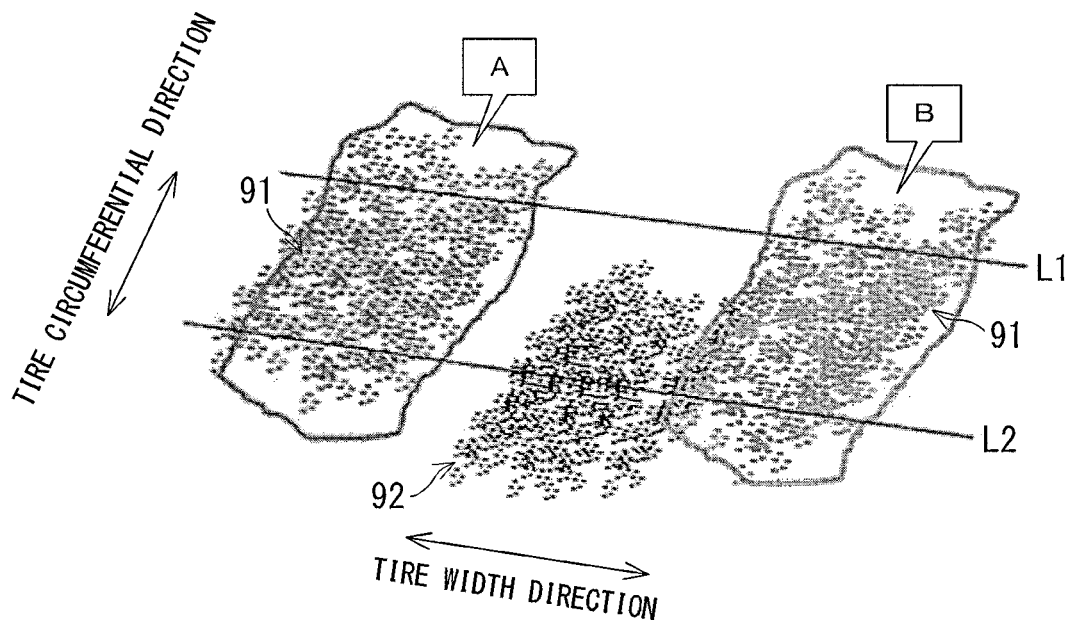
FIG. 5 is a schematic diagram for illustrating extraction of the grounded part by the grounded part extraction unit.

The grounded part extraction unit 40a extracts a plurality of grounded parts 91 based on the three-dimensional coordinate data for and the normal vector of the point group. FIG. 5 is a schematic diagram for illustrating extraction of the grounded part 91 by the grounded part extraction unit 40a. The grounded part extraction unit 40a recognizes a point group characterized by certain continuity (e.g., having normal vectors substantially aligned in the same direction) as a cluster belonging to the same surface. A publicly known method can be used for recognition of a cluster.

The width of the tire groove 90a is normally smaller than the width of the grounded part 91. Therefore, those of the recognized clusters having a small width are regarded as not constituting the grounded part 91, and the rest of the clusters are defined as the grounded part 91. As shown in FIG. 5, the grounded part extraction unit 40a extracts an area A and an area B that constitutes the grounded part 91, sandwiching the tire groove 90a. In the case a plurality of tire grooves 90a are arranged in the tire width direction, the grounded part extraction unit 40a extracts a plurality of areas sandwiching the respective tire grooves 90a.

Figure 6:
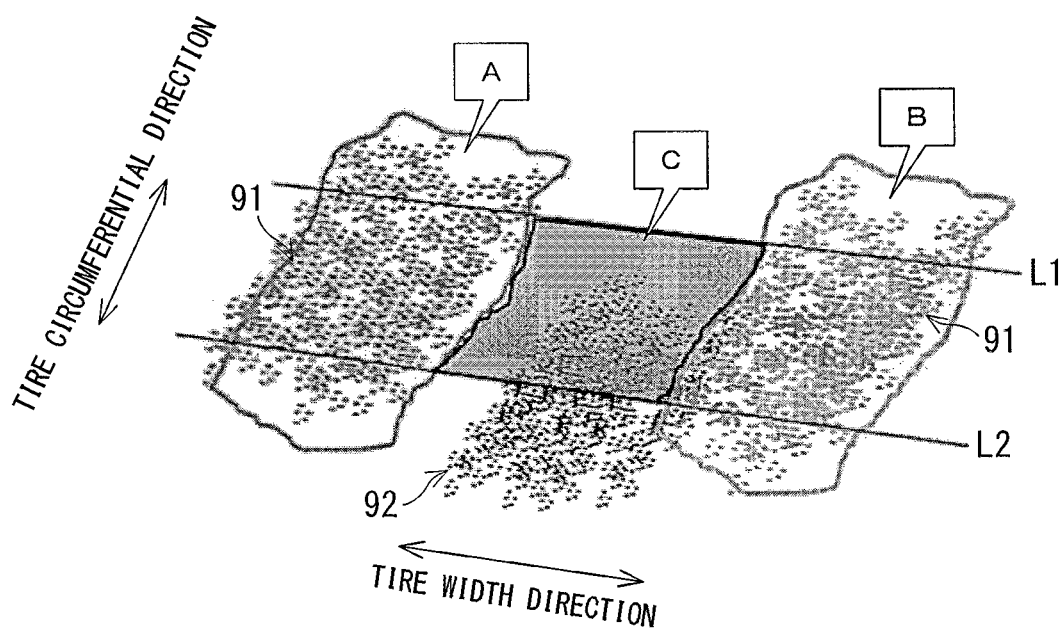
FIG. 6 is a schematic diagram for illustrating an envelope area generated by the groove depth calculation unit.

The area division unit 40b generates tire width direction areas by dividing the respective areas of the grounded part 91 extracted by the grounded part extraction unit 40a in the tire circumferential direction. As shown in FIG. 5, the area division unit 40b divides the plurality of grounded parts 91 by a straight line L1 and a straight line L2 extending in the tire width direction. The area division unit 40b divides each grounded part into equal parts having a length of, for example, 5 cm or smaller along the tire circumferential direction. FIG. 6 shows only some of the divisions, but the grounded part is actually divided into a large number of areas.

FIG. 6 is a schematic diagram for illustrating an envelope area generated by the groove depth calculation unit 40c. Referring to FIG. 6, the area A and the area B as the grounded parts 91 are adjacent to each other in one tire width direction area sandwiched by the straight line L and the straight line L1. The groove depth calculation unit 40c generates an area C between the area A and the area B as an envelope area.

The area C as an enveloped area is a polygonal area bounded by the sides of the area A and the area B facing each other and by the straight line L1 and the straight line L2. The envelope area is an area between the grounded parts 91 and is an area not populated by a point group basically. For example, the groove depth calculation unit 40c generates a plurality of grounded part envelope areas by identifying concave envelopes or convex envelopes for each of the plurality of grounded parts 91 in the tire width direction area and defines an area that remains after excluding the grounded part envelope areas from the tire width direction area as an envelope area.

Since the surface 90 of the tread part 9a is a curved surface, the areas A, B, and C are also inherently curved. By defining the areas to be small enough to allow approximating the curved surface as a flat surface having zero curvature, the calculation can be simplified. More specifically, the areas can be dealt with as flat surfaces in most tires by dividing the areas in the tire circumferential direction at intervals of about 40 mm in setting the tire width direction area.

Figure 7:
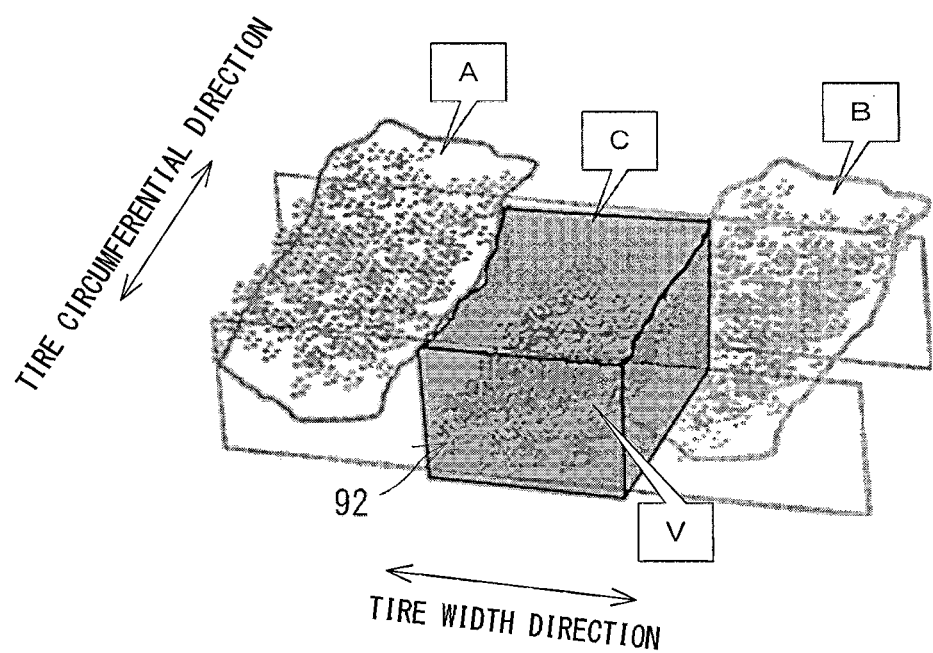
FIG. 7 is a schematic diagram for illustrating generation of a solid area by the groove depth calculation unit.

FIG. 7 is a schematic diagram for illustrating generation of a solid area by the groove depth calculation unit 40c. The groove depth calculation unit 40c generates a columnar solid area V bottomed by the area C (envelope area) and having a certain dimension in the height direction, the height direction being defined as a direction intersecting the bottom, and, for example, the direction normal to the bottom. The predetermined dimension is defined as a value larger than the depth of the main groove according to the tire specification.

The groove depth calculation unit 40c extracts a point group included in the solid area V as a point group in the bottom part 92 of the tire groove 90a. The groove depth calculation unit 40c calculates the groove depth of the tire 9 by calculating the distance of the point group included in the solid area V from the bottom.

For example, the groove depth calculation unit 40c generates a distribution of distances of the point group from the bottom and calculates a median or a 50 percentile value as the groove depth. By approximating the bottom area C by a flat surface as described above, it becomes easy to calculate the direction (normal direction) intersecting the area C and the distance between the point group on the bottom of the tire groove included in the solid area V and the area C.

The image generation unit 40d generates an image that shows the areas extracted by the grounded part extraction unit 40a and information on the depth of the tire groove 90a calculated by the groove depth calculation unit 40c and outputs the image to the display unit 50. The display unit 50 displays the image input from the image generation unit 40d.

In the case the areas of the grounded part 91 are divided by the area division unit 40b in the tire circumferential direction, the image generation unit 40d generates an image including graphics that show the division (e.g., the straight line L1 and the straight line L2 shown in FIG. 5).

In the case the groove depth calculation unit 40c calculates the depth of the tire groove 90a for each tire width direction area, the image generation unit 40d generates an image that shows information on the depth calculated for each tire width direction area.

Figure 8:
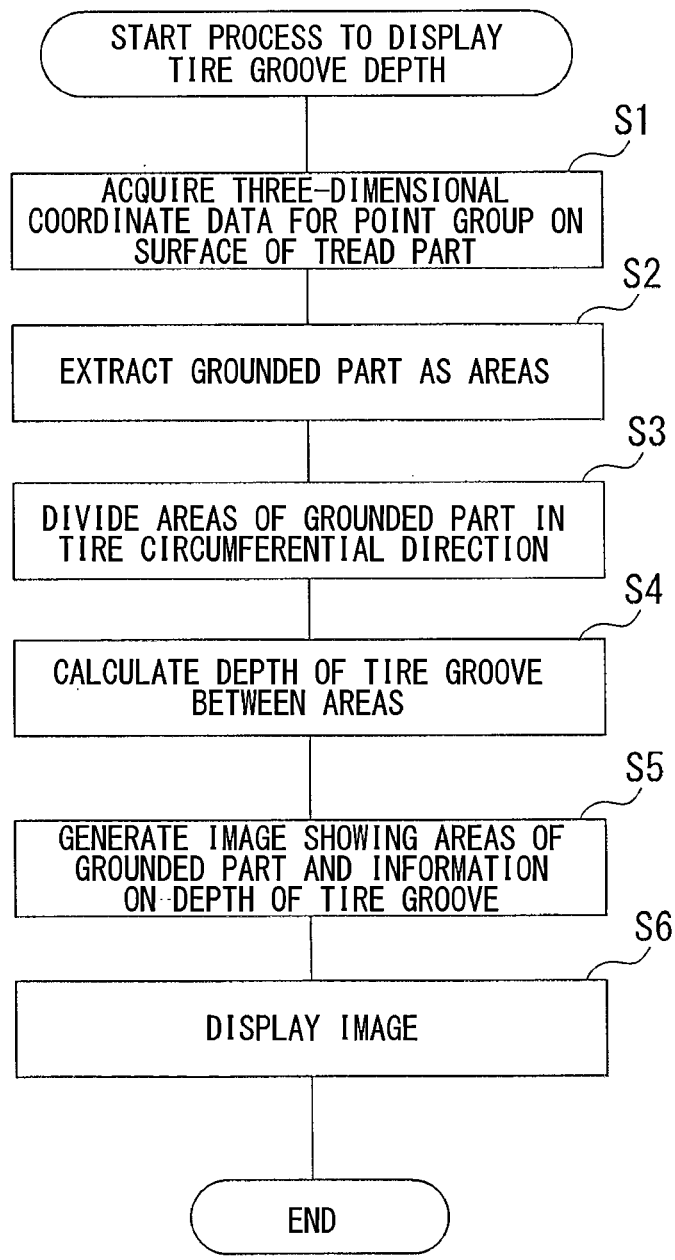
FIG. 8 is a flowchart showing a sequence of steps to display the tire groove depth.

A description will now be given of the operation of the tire groove depth display device 10. FIG. 8 is a flowchart showing a sequence of steps to display the tire groove depth. It is assumed that the scan device 6 captures an image of the surface 90 of the tread part 9a of the tire 9 and measures the three-dimensional coordinate data for the point group on the surface 90 before the process to display the tire groove depth is started. The data acquisition unit 20 of the tire groove depth display device 10 acquires the three-dimensional coordinate data for the point group on the surface 90 of the tread part 9a from the scan device 6 (S1).

The grounded part extraction unit 40a of the tire image processing unit 40 extracts the grounded part 91 as a plurality of areas sandwiching the tire groove 90a, based on the three-dimensional coordinate data for the point group on the surface 90 (S2). The area division unit 40b generates a tire width direction area by dividing the respective areas of the grounded part 91 extracted by the grounded part extraction unit 40a in the tire circumferential direction (S3).

The groove depth calculation unit 40c calculates the depth of the tire groove 90a between the respective areas (S4). The image generation unit 40d generates an image that shows the areas of the grounded part 91 and information on the depth of the tire groove 90a calculated by the groove depth calculation unit 40c (S5) and outputs the image to the display unit 50. The display unit 50 displays the image input from the image generation unit 40d (S6) and terminates the process.

Figure 9:
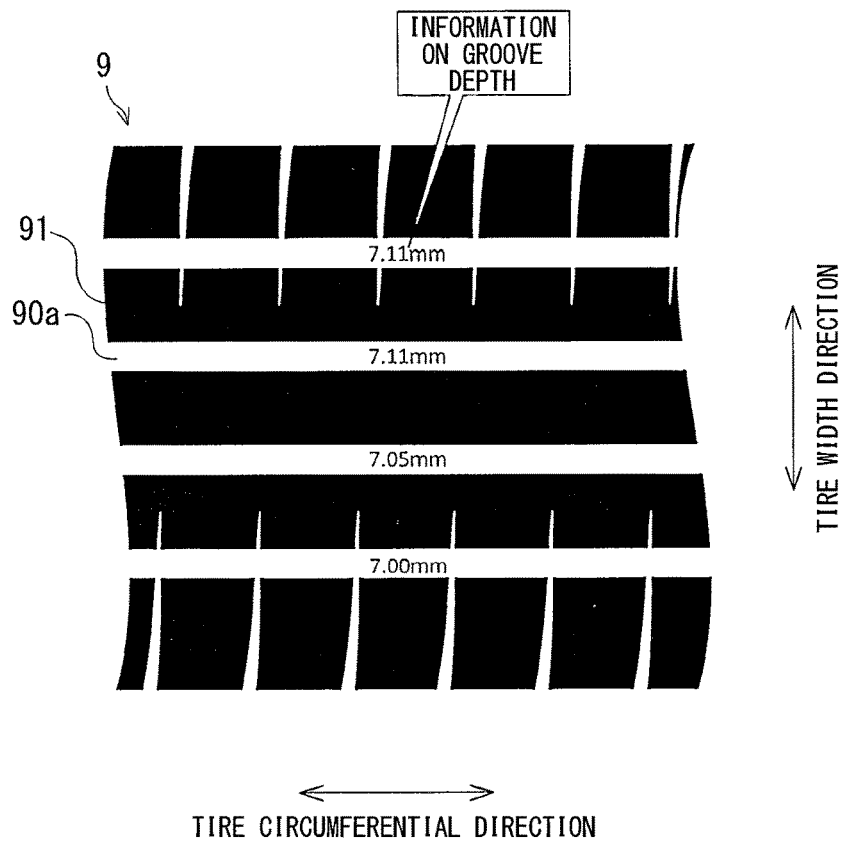
FIG. 9 is a schematic diagram showing an example of image display by the tire groove depth display device.

FIG. 9 is a schematic diagram showing an example of image display by the tire groove depth display device 10. In the image display shown in FIG. 9, the areas of the grounded part 91 are not divided in the tire circumferential direction. The figure shows the areas of the grounded part 91 sandwiching the tire groove 90a and the information (numerical value) on the depth of the tire groove 90a. By displaying the areas of the grounded part 91 and the information on the depth of the tire groove 90a, the tire groove depth display device 10 can improve visibility of unevenness of the wear of the tire 9 in the tire width direction.

Figure 10:
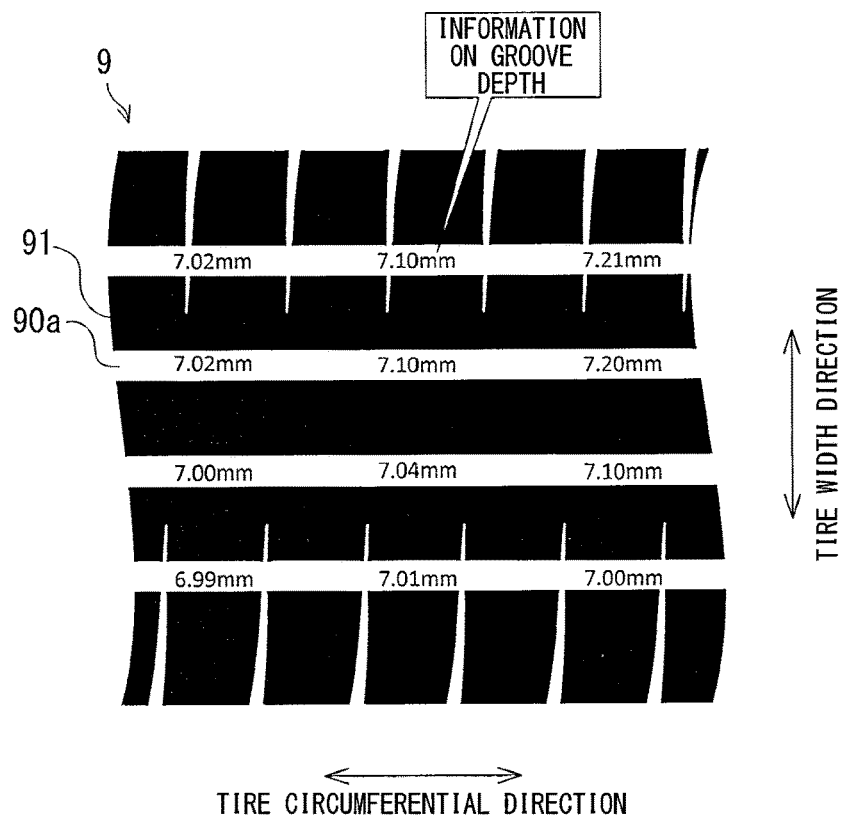
FIG. 10 is a schematic diagram showing another example of image display by the tire groove depth display device.

FIG. 10 is a schematic diagram showing another example of image display by the tire groove depth display device 10. The image display shown in FIG. 10 includes depth information on the tire groove 90a in the tire width direction area derived from dividing the areas of the grounded part 91. By displaying the areas of the grounded part 91 and the information on the depth of the tire groove 90a relevant to the plurality of tire width direction areas, the tire groove depth display device 10 can improve visibility of unevenness of the wear of the tire 9 in the tire width direction and in the tire circumferential direction.

Figure 11A:
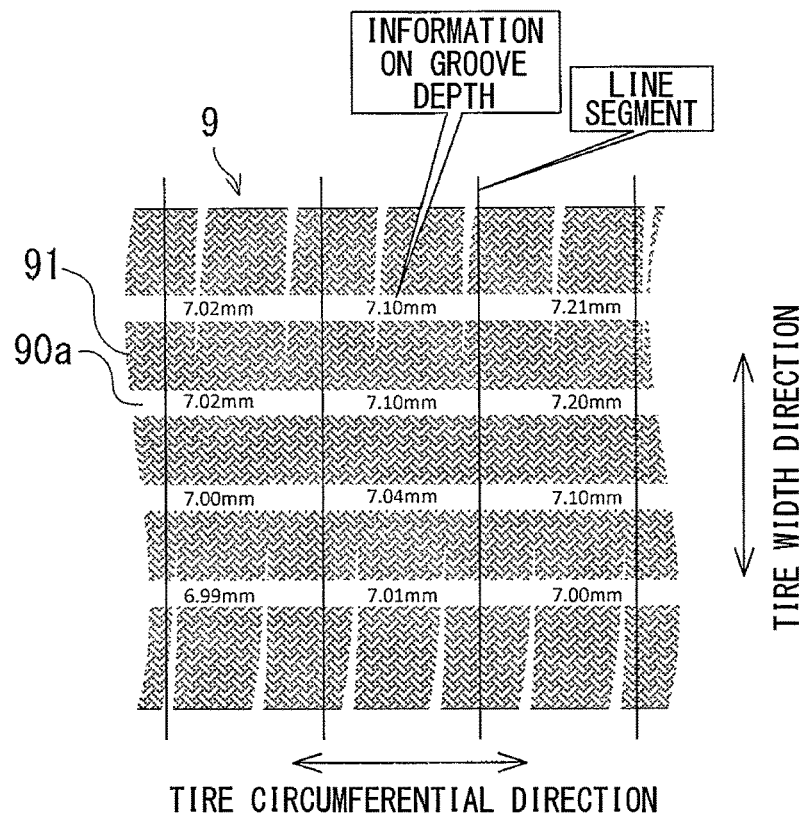
FIGS. 11A and 11B show another example of image display by the tire groove depth display device.
Figure 11B:
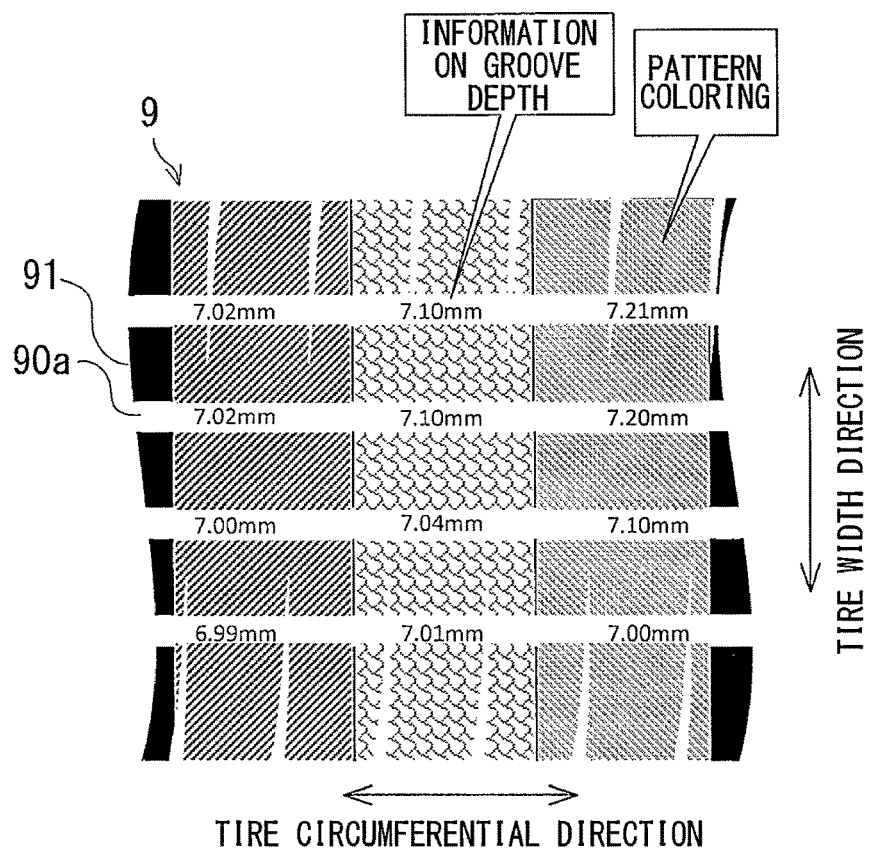

FIGS. 11A and 11B show another example of image display by the tire groove depth display device 10. The image display shown in FIG. 11A shows the tire width direction areas by line segments. The image display shown in FIG. 11B shows the tire width direction areas by patterns and coloring. By showing segmentation of the tire width direction areas expressly, the tire groove depth display device 10 can let the worker know the areas of the grounded part 91 corresponding to the information on the depth of the tire groove 90a more clearly.

In the embodiments described above, the method of extracting the grounded part 91 and the method of calculating the depth of the tire groove 90a by using an envelope area and a solid area have been shown, but the methods of extraction of the grounded part 91 and calculation of the groove depth are not limited to those described.

Figure 12:
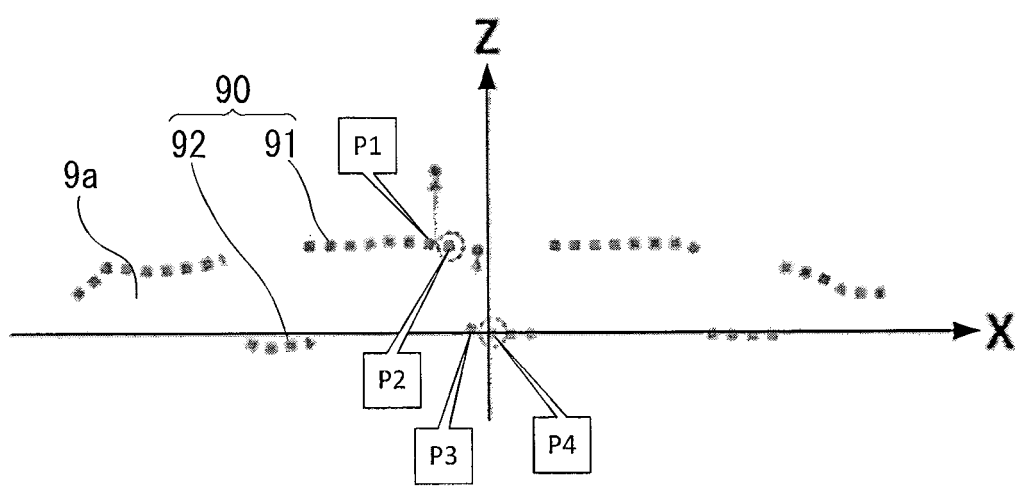
FIG. 12 is a schematic diagram for illustrating a method of extracting the grounded part by moving points and calculating the depth of the tire groove.

FIG. 12 is a schematic diagram for illustrating a method of extracting the grounded part 91 by moving points and calculating the depth of the tire groove 90a. The positions resulting from moving the respective points on the surface 90 of the tire 9 in, for example, the direction of normal vectors are calculated, and the nearest point before the movement of the point and the nearest point after the movement are identified. With regard to a point P1 included in the grounded part 91 shown in FIG. 12, for example, it is identified that the nearest point before the movement and the nearest point after the movement are the same point P2 included in the grounded part 91. With regard to a point P3 included in the bottom part 92, it is identified that the nearest point before the movement is P4 and the nearest point after the movement is P2.

When the nearest point before the movement and the nearest point after the movement as calculated are the same, it is determined that the point is located in the grounded part 91. When the nearest points differ, it is determined that the point is located in the bottom part 92. For each point on the surface 90 of the tire 9, a determination is made as to whether the point belongs to the grounded part 91 or the bottom part 92, and then the height of the grounded part 91 and the bottom part 92 in the Z direction are determined to calculate the depth of the tire groove 90a.

Further, the grounded part 91 may be extracted by discriminating the gray value of the grounded part 91 from that of the tire groove 90a in the image that captures the surface 90 of the tire 9. The surface of the tire 9 may be scanned by a ranging instrument that uses laser light or millimeter waves to extract the grounded part 91 and calculate the depth of the tire groove 90a.

A description will now be given of characteristics of the tire groove depth display device 10 and the tire groove depth display method according to the embodiment. The tire groove depth display method according to the embodiment includes a grounded part extracting step, a groove depth calculating step, an image generating step, and a displaying step. The grounded part extracting step extracts the grounded part 91 on the surface 90 of the tread part 9a of the tire 9 as a plurality of areas sandwiching the tire groove 90a. The groove depth calculating step calculates the depth of the tire groove 90a between the respective areas of the grounded part 91. The image generating step generates an image that shows the areas extracted by the grounded part extracting step and information on the depth of the tire groove 90a calculated by the groove depth calculating step. The displaying step displays the image generated by the image generating step. According to this tire groove depth display method, visibility of unevenness of the wear of the tire 9 in the tire width direction can be improved by displaying the areas of the grounded part 91 and the information on the depth of the tire groove 90a.

The tire groove depth display method further includes an area dividing step for generating a tire width direction area by dividing the areas extracted by the grounded part extraction step in the tire circumferential direction. The groove depth calculating step calculates the depth of the tire groove 90a for each tire width direction area. The image generating step generates an image that shows the information on the depth of the tire groove 90a calculated by the groove depth calculating step for each tire width direction area. According to this tire groove depth display method, visibility of unevenness of the wear of the tire 9 in the tire width direction and in the tire circumferential direction can be improved by displaying the areas of the grounded part 91 and the information on the depth of the tire groove 90a relevant to the plurality of tire width direction areas.

Further, the image generating step generates an image that shows the tire width direction area divided into segments. According to this tire groove depth display method, it is possible to let a worker know the areas of the grounded part 91 corresponding to the information on the depth of the tire groove 90a more clearly.

The tire groove depth display device 10 includes a grounded part extraction unit 40a, a groove depth calculation unit 40c, an image generation unit 40d, and a display unit 50. The grounded part extraction unit 40a extracts the grounded part 91 on the surface 90 of the tread part 9a of the tire 9 as a plurality of areas sandwiching the tire groove 90a. The groove depth calculation unit 40c calculates the depth of the tire groove 90a between the respective areas of the grounded part 91. The image generation unit 40d generates an image that shows the areas extracted by the grounded part extraction unit 40a and information on the depth of the tire groove 90a calculated by the groove depth calculation unit 40c. The display unit 50 displays the image generated by the image generation unit 40d. Accordingly, the tire groove depth display device 10 can improve visibility of unevenness of the wear of the tire 9 in the tire width direction by displaying the areas of the grounded part 91 and the information on the depth of the tire groove 90a.

Described above is an explanation based on an exemplary embodiment. The embodiments are intended to be illustrative only and it will be understood to those skilled in the art that variations and modifications are possible within the claim scope of the present invention and that such variations and modifications are also within the claim scope of the present invention. Therefore, the description in this specification and the drawings shall be treated to serve illustrative purposes and shall not limit the scope of the invention.

What is claimed is:

1. A tire groove depth display method comprising:
   extracting a grounded part on a surface of a tread part of a tire as a plurality of areas sandwiching a tire groove;
   removing a side part of the tire groove, a normal vector of the side part being orthogonal to a radial direction of the tire;
   calculating a depth of the tire groove between respective areas of the grounded part;
   generating an image that shows the areas extracted by the extracting and information on the depth of the tire groove calculated by the calculating; and
   displaying the image generated by the generating.

2. The tire groove depth display method according to claim 1, further comprising:
   generating a tire width direction area by dividing the areas extracted by the extracting in a tire circumferential direction,
   wherein the calculating calculates the depth of the tire groove for each tire width direction area, and
   wherein the generating generates an image that shows the information on the depth of the tire groove calculated by the calculating for each tire width direction area.

3. The tire groove depth display method according to claim 2, wherein the generating generates an image that shows the tire width direction area divided into segments.

4. A tire groove depth display device comprising:
   a grounded part extraction unit that extracts a grounded part on a surface of a tread part of a tire as a plurality of areas sandwiching a tire groove;
   a groove depth calculation unit that calculates a depth of the tire groove between respective areas of the grounded part;
   an image generation unit that generates an image that shows the areas extracted by the grounded part extraction unit and information on the depth of the tire groove calculated by the groove depth calculation unit; and
   a display unit that displays the image generated by the image generation unit, wherein the grounded part extraction unit removes a side part of the tire groove, a normal vector of the side part being orthogonal to a radial direction of the tire.

* * * * *